Nov. 10, 1931.  W. W. LASKER  1,831,358
TABULATOR PRINTER
Filed July 7, 1925   8 Sheets-Sheet 2

Fig. 2.

INVENTOR.
William W. Lasker,
BY Robert M. Barr
ATTORNEY.

Nov. 10, 1931.  W. W. LASKER  1,831,358
TABULATOR PRINTER
Filed July 7, 1925   8 Sheets-Sheet 3

INVENTOR.
William W. Lasker,
BY Robert M. Barr
ATTORNEY.

Nov. 10, 1931.   W. W. LASKER   1,831,358

TABULATOR PRINTER

Filed July 7, 1925   8 Sheets-Sheet 4

INVENTOR.
BY William W. Lasker,
Robert M. Barr.
ATTORNEY.

Nov. 10, 1931.  W. W. LASKER  1,831,358
TABULATOR PRINTER
Filed July 7, 1925     8 Sheets-Sheet 7

INVENTOR.
William W. Lasker,
BY Robert M. Barr.
ATTORNEY.

Patented Nov. 10, 1931

1,831,358

UNITED STATES PATENT OFFICE

WILLIAM W. LASKER, OF BROOKLYN, NEW YORK, ASSIGNOR, BY MESNE ASSIGNMENTS, TO REMINGTON RAND INC., OF NEW YORK, N. Y., A CORPORATION OF DELAWARE

TABULATOR PRINTER

Application filed July 7, 1925. Serial No. 42,060.

This invention relates to automatic tabulator printer accounting machines, controlled by perforated record cards, such, for example, as that disclosed in United States Patent No. 1,438,924, dated December 12, 1922, and relates more particularly to the indication of totals.

Some of the objects of the present invention are to provide an automatic variable line spacing mechanism for tabulator printing machines whereby indication is made of a printed total; to provide means for leaving a margin or blank space between a printed total and the following group of printed items without using a space card for that purpose; to provide an improved tabulating printing mechanism whereby the use of total space cards is eliminated and incidentally therefore does away with the expense of such space cards and the labor of putting them in place for total purposes; to provide a mechanism controlled by the presentation of a total card between the analyzer plates to cause the line spacer to be actuated an additional space automatically when a total printing takes place; in other words it is an object of the invention to provide means whereby the line spacer of a printing tabulator is actuated to turn the platen one line space each time a record card passes through the machine and to turn the platen two line spaces each time a total card causes a total operation; and to provide other improvements as will hereinafter appear.

Other features and advantages will hereinafter appear.

In the apparatus herein disclosed cards 1, perforated in accordance with certain data to be tabulated, are placed in a card magazine 2 with their lower edges resting on guides 3 and are pressed forwardly or toward the rear of the magazine by a follower 4 attached to tapes 5 extending from spring drums 6. At the rear of the magazine (Fig. 1) there is a card picker 7 vertically reciprocable on posts 8 and comprising a blade or plate 9 which on the downward movement of the card picker moves the nearest card in the magazine downwardly to a sufficient extent to cause it to be gripped by front and rear rolls 9a and fed thereby between registration plates 10 and front and rear feed rolls 11 yieldably engaging the edges of the card so as to permit slipping when the lower edge of the card comes into engagement with a card gate 12. While the card is so held by the card gate 12 in the analyzing position, the matter recorded by the perforations in the card is analyzed by means of a pin box 13 which is moved rearwardly to cause yieldably supported pins 14 therein to engage the card at index points thereon. At index points where there are no perforations the pins 14 will be arrested and held against further movement, but at index points where there are perforations the index pins will pass through such perforations and either directly or indirectly actuate corresponding plungers 15 which through flexible connections, not shown, will cause type sectors 16 of the tabulator printer indicated in general by 17, to be set up in accordance with the item to be tabulated and printed. Printing on a sheet or web 18 may then be effected as by moving a platen 19 against types 20 positioned at the printing line by the sectors. To prevent the feeding of more than one card at a time from the magazine provision is made of means including an adjustable block 22.

Upon withdrawal of the pin box 13 from its analyzing position the card gate 12 will be shifted to open position and the card just analyzed moved downwardly along a guiding device 23 to and through rolls 24 from which it may be passed between discharge rolls 25 and under a guide 26 to a receiver 27 comprising a platform 28 guided by means including vertical rods 29 and supported by a rod 30, guided at its lower end in a horizontal portion of a bracket 31, and a helical spring 32 surrounding the supporting rod 30 and interposed between the bracket and a collar 33 on the rod.

Figure 1:
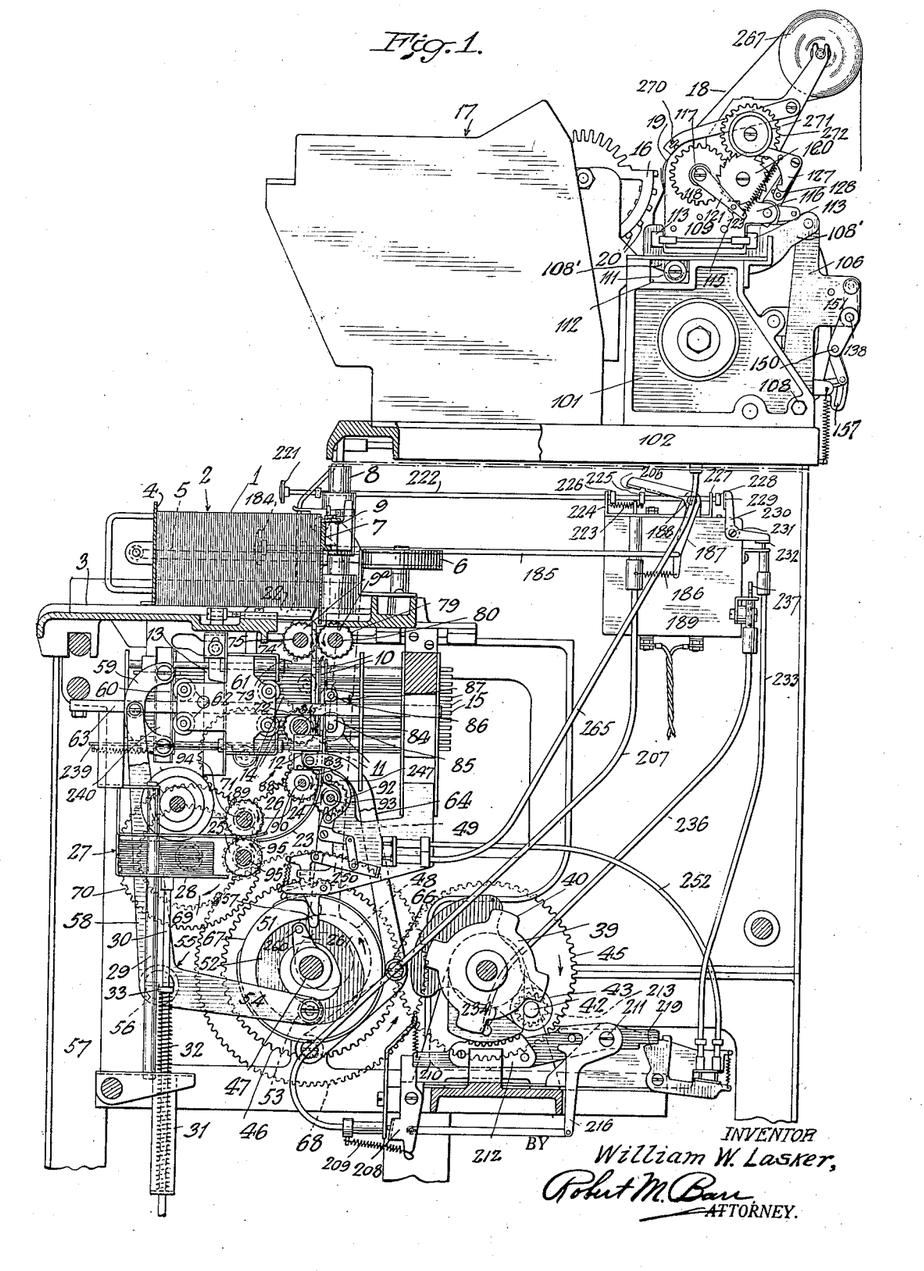
Fig. 1 is a fragmentary side elevation of a tabulating machine with one embodiment of the invention applied thereto.
Figure 2:
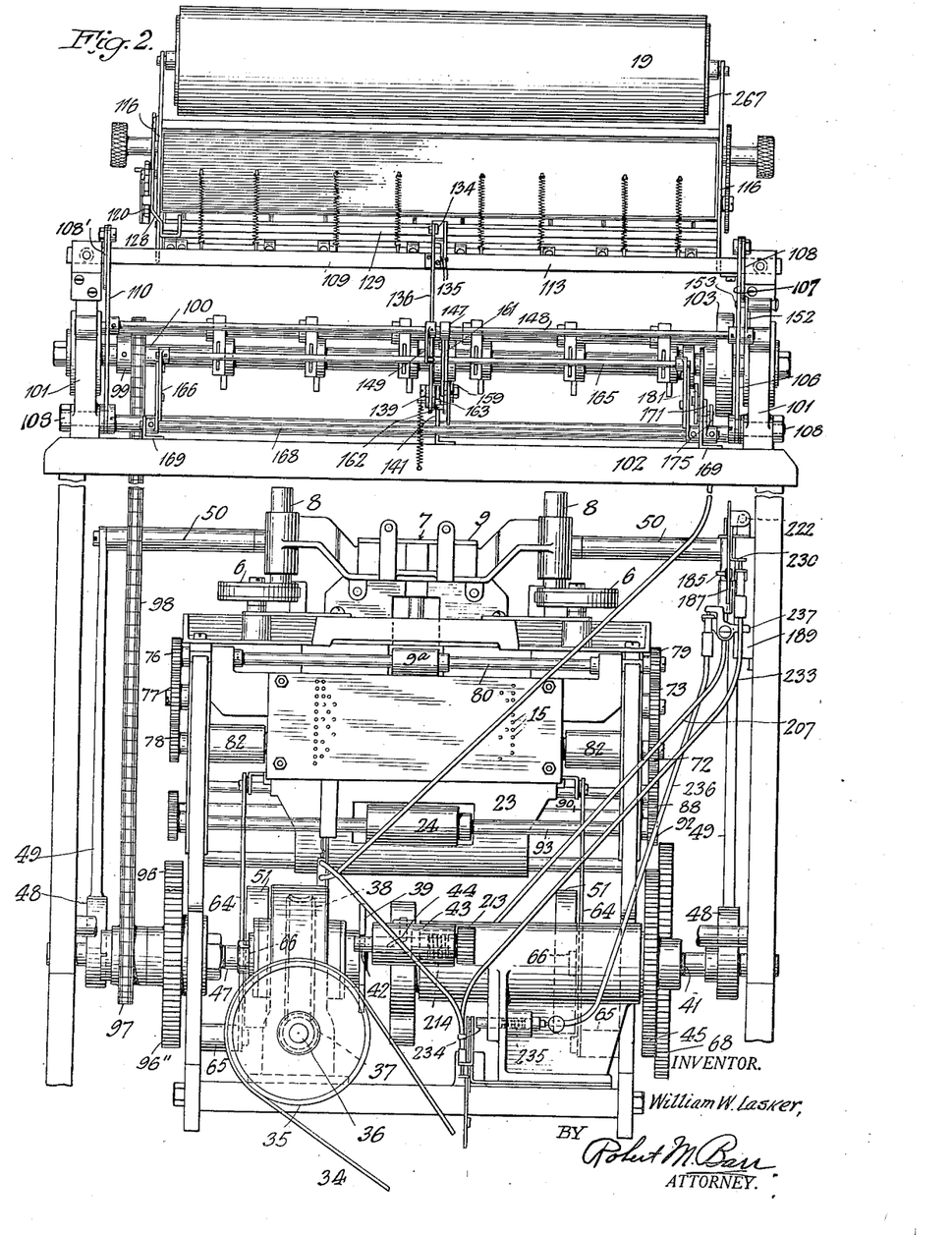
Fig. 2 is a rear elevation.

The machine is driven by suitable means such as an electric motor, not shown, from which connection is made by a belt 34 (Fig. 2) to a pulley 35 on a shaft 36 provided with a worm 37 meshing with a worm gear 38 driving a clutch member 39, (Fig. 1), having radial arms 40. From the clutch member 39 power is transmitted to a shaft 41 coaxial with the worm gear 38 by engagement of one of the radial arms 40 with a clutch pin 42 rotatably mounted at a considerable distance from the shaft 41 in a bracket 43 fixed on the shaft 41. The clutch pin 42 has a pin-and-cam-slot connection 44 with the bracket 43 so that upon turning the clutch pin in a counter-clockwise direction, as seen in Fig. 1, the pin 42 will be withdrawn from the path of the arms 40 and the clutch connection broken. Means for controlling the clutch connection will be described hereinafter.

Mounted on the shaft 41 (Figs. 1 and 2) is a gear 45 meshing with a gear 46 on a shaft 47 which may be considered as the main driving shaft of the machine. To operate the card picker 7 provision is made of eccentrics 48 connected by links 49 with pins 50 extending laterally from the card picker 7. Actuation of the pin box 13 is effected by means of discs 51 fixed on the shaft 47 and provided with cam grooves 52 into which project rolls 53 on the rear ends of arms 54 of elbow levers 55 pivoted at 56 on fixed parts of the frame 57. The upright arms 58 of the elbow levers 55 are pivoted at their upper ends to brackets 59 on members 60 forming part of a pin box carriage 61 provided with rollers 62 engaging rails 63. To actuate the card gate 12 provision is made of bent levers 64 pivoted at their upper ends to the card gate and at their lower ends on members 65 projecting inwardly from the sides of the frame 57, and provided with rolls 66 resting on the peripheries of the discs 51, which hold the card gate in closed position until depressions 67 in the discs 51 reach positions to permit the rolls 66 to move toward the shaft 47 and the card gate 12 to move to open position.

Figures 3, 4, 5:
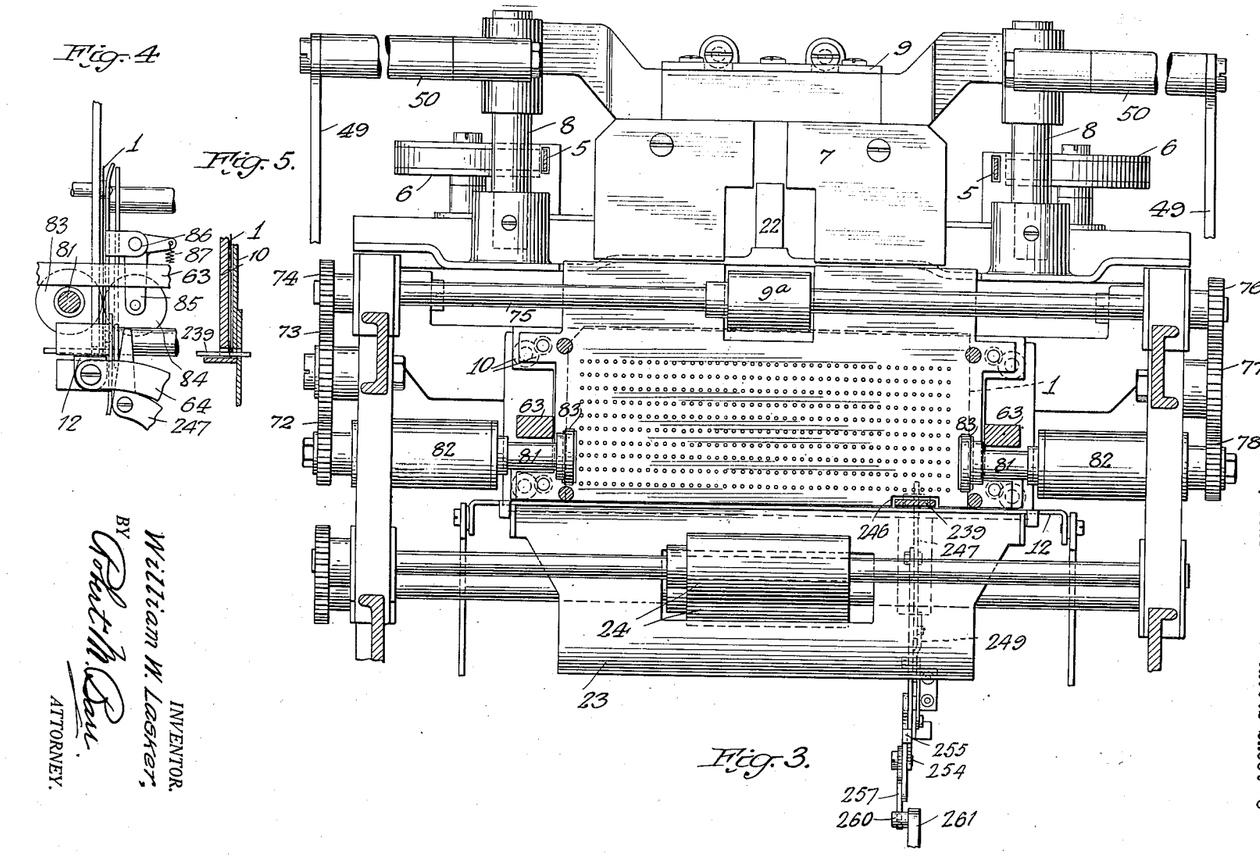
Fig. 3 is a front elevation of a part of the mechanism at the analyzing position.
Fig. 4 is a view illustrating the condition set up when a total card is presented at the analyzing position.
Fig. 5 is a sectional side elevation corresponding to Fig. 4.

Actuation of the various sets of feed rolls is effected by a gear wheel 68 (Fig. 1) mounted on the shaft 47 at the left of the machine and acting through a train of gears 69, 70, 71, 72, 73 and 74 at the left of the machine. The gear 74, (Fig. 3) is fixed on a shaft 75 carrying the front roll 9a and supplied at its other end with another gear 76 to act through a gear 77 to turn a gear 78 at the right of the machine. The gear 74 meshes with gear 79, (Fig. 1), on a shaft 80 carrying the rear roll 9a.

The gears 72 and 78 (Fig. 3) are mounted on shafts 81 extending through bearings 82 on the side frames and carrying thereon at their inner ends rolls 83 to engage the front face of a card in the analyzing position at points adjacent the edges of the card. At the rear of each roll 86 is a roll 84, (Figs. 1 and 4), to press the edges of a card against the front rolls 83.

Each of the rolls 84 is mounted on a support 85 pivoted on a fixed bracket 86 and acted upon by a spring 87 to press the corresponding roll 84 against the back of the card. The pressure exerted between the front and rear rolls of these sets is such as to assure satisfactory feeding of the cards under ordinary conditions but to permit slipping when a card engages the card gate 12. The gear 71 also acts through gears 88 and 89 to actuate the other sets of feed rolls 24 and 25. The gear 88 is mounted on a shaft 90 carrying the front roll 24 and meshes with a gear 92 on a shaft 93 carrying the rear roll 24 to cause these two feed rolls to work in unison. The gear 89 is mounted on a shaft 94 carrying the front roll 25 and meshes with a gear 95 on a shaft 95' carrying the rear roll 25 to cause these two rolls to work in unison.

To move the platen 19 against the types 20 to effect printing, provision is made of a gear 96 (Fig. 2) on the shaft 47 meshing with a gear 96" mounted on a stub shaft and driving a sprocket wheel 97 connected by a chain 98 with a sprocket wheel 99 fixed on a shaft 100 journalled in brackets 101 on a plate or table 102 forming part of the frame. This shaft 100 carries at its left end a disc 103 with a cam groove 104, (Figs. 7 and 11), receiving a roll 105 on a forwardly extending arm 106 of an elbow lever 107 mounted on a stud shaft 108 located in the housing bracket 101. The upright end of the elbow lever 107 is pivotally connected wi h an end plate 108', (Fig. 1), of a platen carriage 109 and a corresponding arm 110, (Fig. 2), mounted on a stud shaft 108 at the other end of the table 102 is pivotally connected with the other end plate 108'. As indicated in Fig. 1 the end plates 108' are supported adjacent their forward ends with rollers 111, (Fig. 11), working in slots 112 in the brackets 101. The platen carriage 109 comprises two grooved rails 113 into which project ribs 114 forming part of a platen frame 115 comprising ends 116 in which the platen 19 is mounted by means including a shaft 117 on which is mounted a gear 118 meshing with a second gear 119 mounted on the adjacent end plate 116 and fastened to a ratchet wheel 120.

Figure 11:
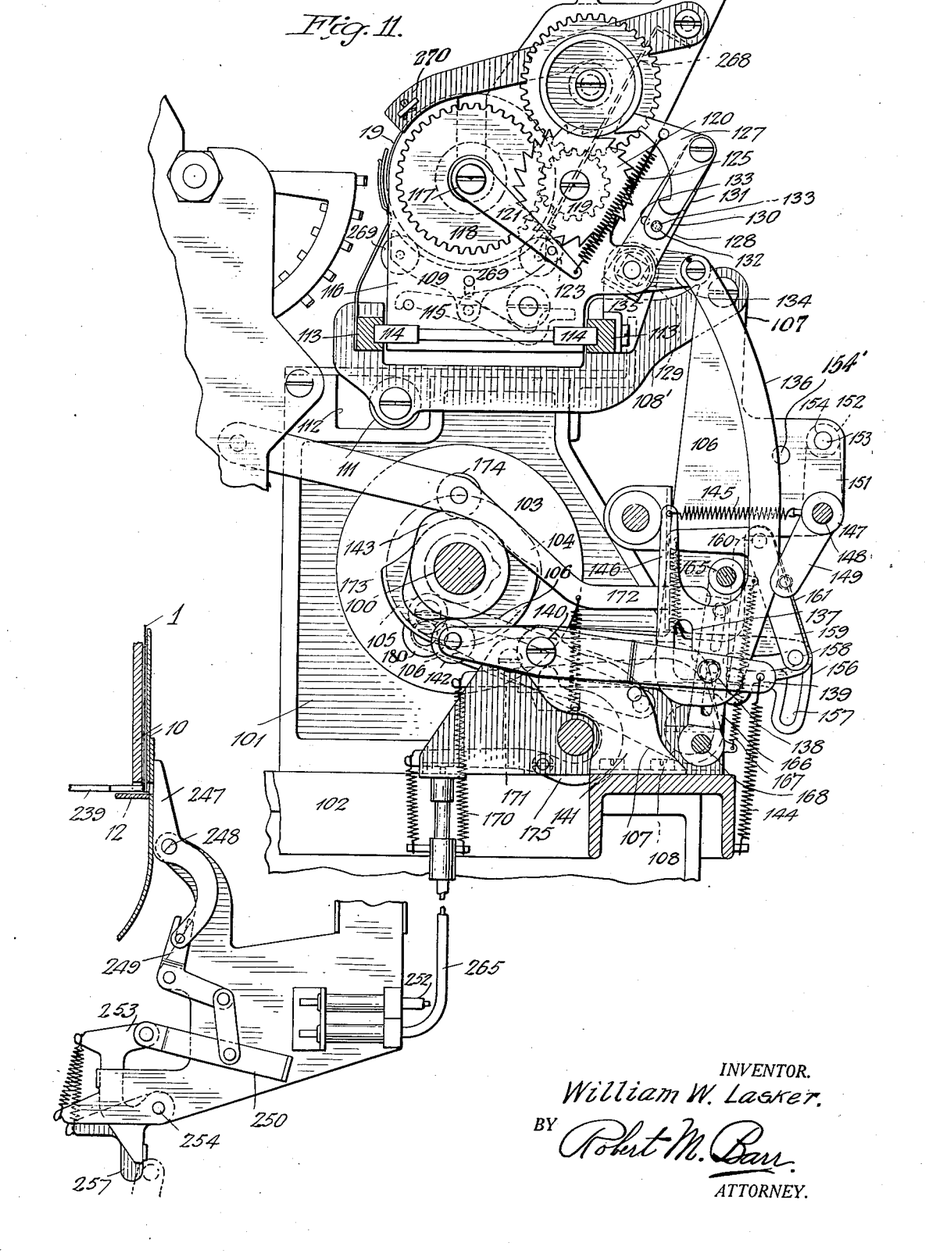
Fig. 11 is a fragmentary side elevation of the line spacing means and the card-controlled means for varying the actuation thereof, the parts being shown in the home or neutral position.
Figure 12:
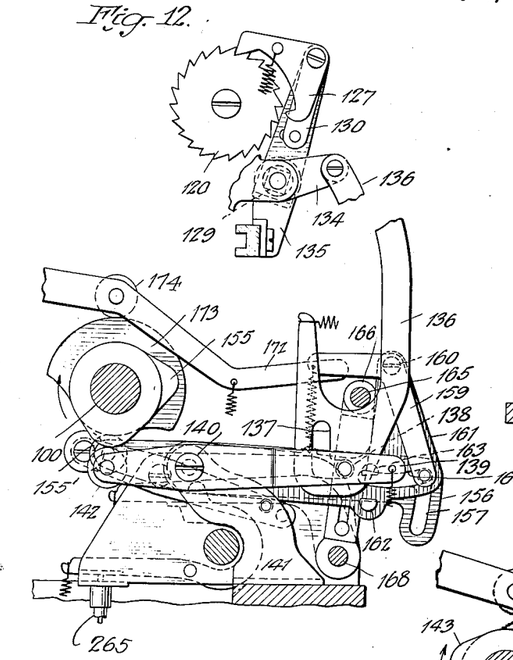
Fig. 12 is a fragmentary side elevation illustrating the relative positions assumed by parts of the line spacing mechanism during normal operation.
Figure 13:
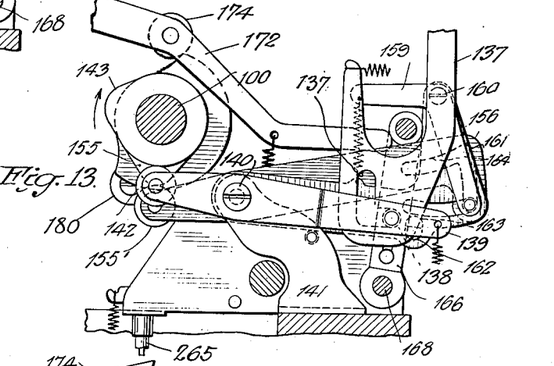
Fig. 13 is a view similar to Fig. 12 but with the parts in different positions.

Pivotally mounted on the end of the shaft 117 (Fig. 11) is an arm 121 carrying a detent member preferably in the form of a roll 123 yieldably held against the ratchet wheel 120 by means of a spring 125 attached at one end to the detent arm 121 and at the other end to a driving pawl 127 pivoted on an arm 128 mounted upon and actuated by a squared shaft 129 pivoted in the ends 116 of the platen frame. The position of the pawl 127 on the arm 128 is determined by means of a leaf spring 130 interposed between the pawl and the arm and provided with a lateral projection or lug 131 engaging the rear edge of the downwardly extending arm of the pawl 127. The leaf spring 130 is provided with a projection 132 to enter either one of two recesses 133 in the arm 131. When the projection 132 of the spring is in the rearward recess 133, as seen in Fig. 11, the pawl 127 will engage and operate the ratchet wheel 120 when the arm 128 is actuated. If, however, the spring 129 is swung to the position in which the projection 132 thereon is seated in the other recess 133 the pawl 127 will be held in inoperative position.

Slidably mounted on the squared shaft 129 is a rearwardly extending operating arm 134 held against movement transversely of the machine by two bracket arms 135 attached to the rear rail 113 and having at their upper ends circular openings through which the squared shaft 129 passes. Such bracket arms serve to support the shaft 129 against bending stresses due to the action of the operating arm 134 and also to counteract any tendency of the arm to move with the squared shaft when the platen frame is shifted transversely of the machine.

Actuation of the arm 134 is effected by means of a link 136 pivoted at its upper end to the rear end of such arm 134 and having in its enlarged lower end an L-shaped slot 137, (Figs. 12, 13, 16, 17, 18 and 19), through which extends a member 138 in the bifurcated rearward arm of a lever 139 pivoted at 140 intermediate its ends on a bracket 141 on the table and having at its forward end a roller 142 engaged by a cam 143 on the shaft 100 and having a raised portion to actuate the lever 139 once for every revolution of the shaft 100. The roller 142 is held against the cam 143 by a spring 144 connected at its upper end with the rear end of the lever and at its lower end with a fixed part of the frame.

Figure 14:
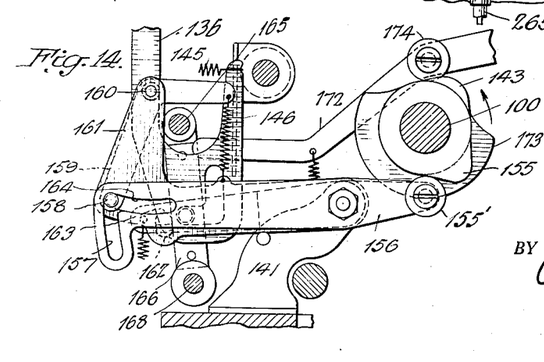
Fig. 14 is a view showing the same parts as Fig. 13 but seen from the opposite side, with the parts in their home position.

The L-shaped slot 137 (Figs. 12, 13 and 14) has an upright branch and a second branch extending rearwardly from the bottom thereof so that if the lower end of the link 136 is shifted rearwardly under the influence of a spring 145 attached to an upright finger 146 on the enlarged lower end of said link and at its rear end to a collar or hub 147 on a shaft 148, the member 138 will merely move up and down in the upright branch of the slot 137 and there will be no actuation of the link 136. Normally the link is held in its forward or operative position by an arm 149, (Fig. 11), projecting from said hub 147 and having a lateral projection or finger 150 to engage the rear edge of the link 136. The shaft 148 is journalled in rearward extensions 151 of the upright arms 106 of the platen shifting levers 107 and is provided at one end with a crank 152 provided with a detent pin 153 to seat in a rearward hole 154 in one of said extensions to hold the link in operative position or to seat in a forward hole 154' and permit the spring 145 to move the link 136 to ineffective position or one in which the connection between the link 136 and the lever 139 is rendered ineffective.

It is desirable at certain times to effect an additional feeding movement of the platen during each revolution of the shaft. For this purpose the cam 143 (Fig. 13) is provided with a second cam 155 to engage a roller 155' on a lever 156 pivoted at 140 and raise the rear end of the lever 156 after the actuation of the lever 139 in the usual way. It will be seen that cams 143 and 155 have a common hub. At its rear end the lever 156 is provided with an L-shaped slot 157, (Figs. 11 to 14 and 16 to 19) having a generally horizontal arcuate branch and a second branch concentric with the pivot 140 of the lever. Extending into the slot is a projection or follower 158 on a downwardly extending arm of an angle lever 159 pivoted at 160 on a lever 161 mounted on the same pivot 140 as the operating levers 139 and 156 just referred to and having a lug 162 to engage under a lug 163 on the lever 139 for lifting the latter and turning the platen an additional step. It will be seen that the projection or follower 158 passes through a slot 164 in the lever 156 concentric with the pivot 160.

The projection 158 on the lever 159 is usually in the upright portion of the slot 157 so that actuation of the lever 156 does not effect operation of the other lever 161. At certain times the lever 159 is shifted to bring the projection 158 thereof forward into the generally horizontal portion of the slot 157 to render a second lever 156 effective to cause line spacing of the paper.

Figure 15:
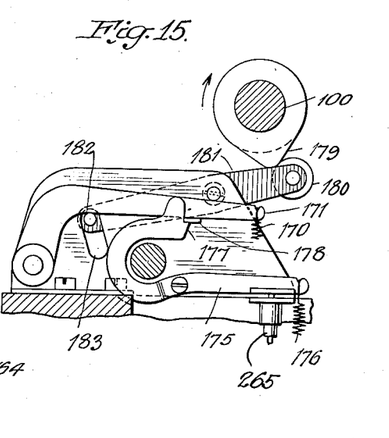
Fig. 15 is a view of mechanism for restoring certain parts to their normal positions after a total taking operation, the parts being shown in the position they assume just before the end of an operation.
Figures 16, 17, 18:
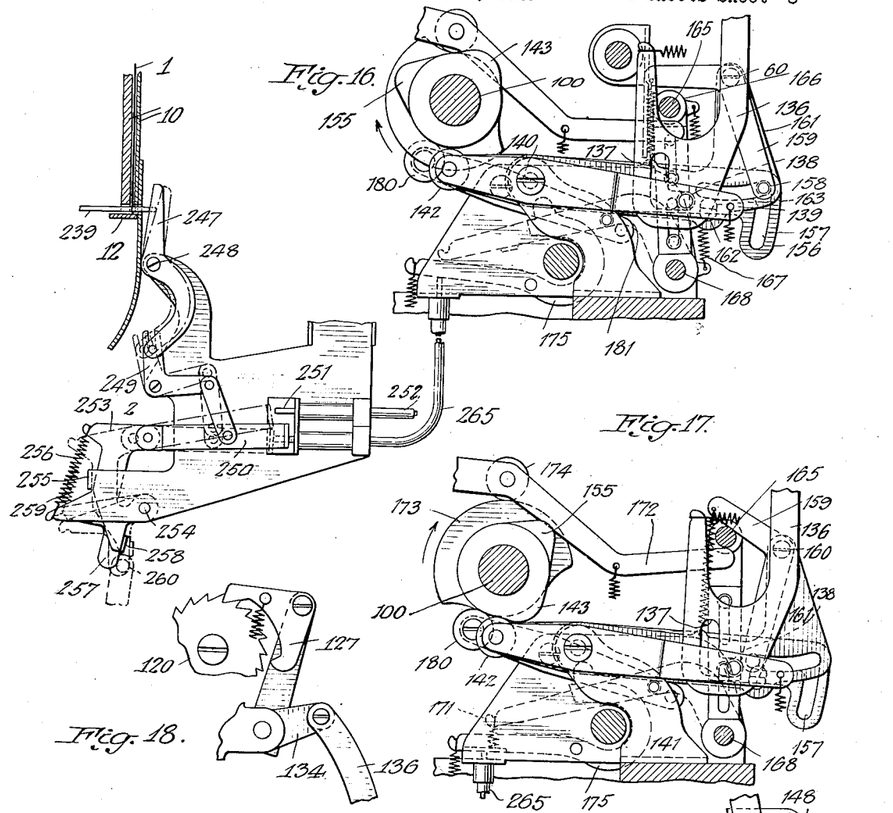
Fig. 16 is a view showing the relation of the parts when positioned for total taking, near the beginning of a cycle of operation.
Fig. 17 is a view showing the parts positioned for effecting the second step of the line spacing mechanism in a double-line-spacing operation, at a later period in the cycle of operation than in Fig. 16.
Fig. 18 is a view similar to Fig. 17 but at a later step of the double-line-spacing operation.
Figure 19:
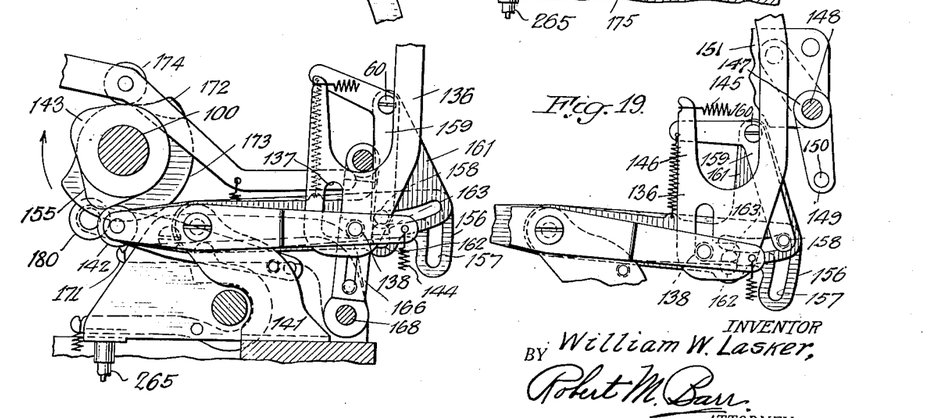
Fig. 19 is a view showing the line spacing mechanism thrown out of operation.

To so shift the lever 159 use is made of a rod 165 supported by extensible linkages 166 normally held in contracted condition by springs 167. The linkages 166 are mounted on a shaft 168 journalled in brackets 169 on the table 102 and urged forwardly by a spring 170 connected with a lever 171 fixed on the shaft. Normally the shaft or rod is held in rearward position, out of the path of pivoted arms 172 actuatable by cams 173 on the shaft 100, and engaging rollers or followers 174 on the arms 172, by means of a pivoted latch 175, (Fig. 15), urged by a spring 176 to maintain a tooth 177 under a laterally extending lug 178 on the lever 171.

Upon swinging the latch 175 in a clockwise direction (Fig. 11), the lever 171 will be released and the rod 165 swung forwardly over the rear ends of said arms 172 to be raised thereby and by swinging the lever 159 cause a secondary step of the platen after the step usually effected during a single rotation of the shaft 100. The rod 165 will then be swung to its normal position by a cam 179, (Fig. 15), on the shaft 100 and, acting through a roller 180 on a lever 181 pivoted on one bracket 169, actuate the lever 181 to cause the pin 182 thereon and projecting through an opening 183 in the bracket to lift the lever 171 to a position to be restrained by the latch 175 and hold the rod 165 in ineffective position. The releasing movement of the latch 175 may be effected automatically by means to be described hereinafter.

Figures 8, 9, 10:
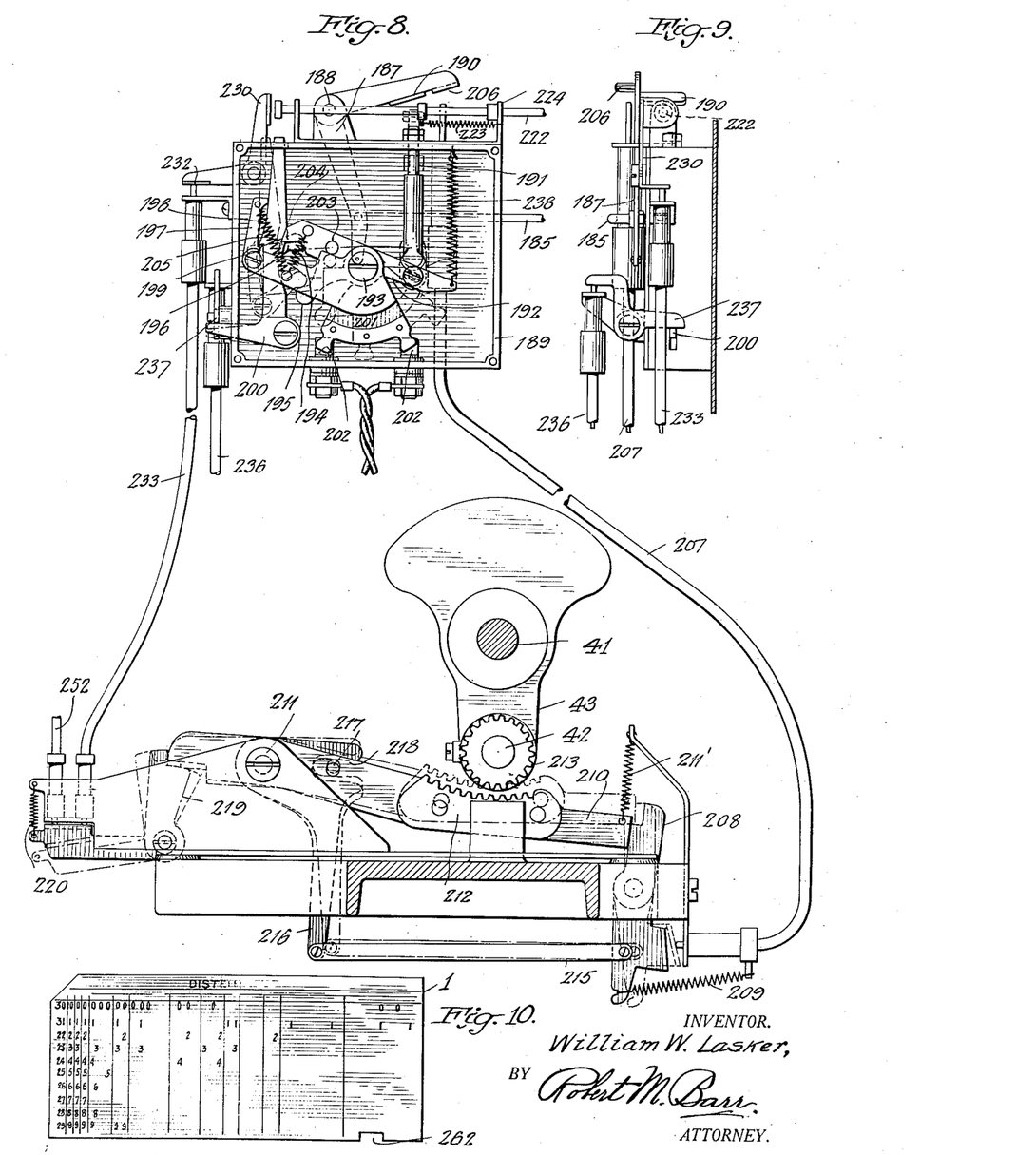
Fig. 8 is a view on a larger scale of a portion of the structure shown in Fig. 1, one side of the switch box being removed.
Fig. 9 is a detail view of the switch box as viewed from the left in Fig. 8.
Fig. 10 is a view showing a statistical card adapted to effect total taking.

The machine may be started by pressing rearwardly a handle 184 (Fig. 1) and rod 185 connected thereto to swing, against the action of a spring 186, a bell crank 187 about its pivot 188 on a switch box 189 to close the circuit through the motor and to render the clutch effective. In such movement of the bell crank, a lug 190, (Figs. 8 and 9) thereon depresses a plunger 191 having a pin and slot connection with a lever 192 and rocks the latter about a pivot 193 to the full line position in Fig. 8. In this operation a spring 194 is put under stress and, after a lug 195 on the lever 192 by engagement with an arm 196 has shifted a pawl 197 against the action of a spring 198 out of engagement with a shoulder 199 on an upright arm of a bell crank 200, a switch member 201 will be shifted quickly to the full line position (Fig. 8) to close the motor circuit through terminals 202. At this time the switch member 201 is in engagement with a stop 203 on the lever and a tooth 204 on the lever engages a shoulder 205 on the upright arm of the bell crank 200 and is locked in such position.

Concomitantly with the closing of the motor circuit a lug 206 of the starting bell-crank 187 will actuate the core of a flexible connection 207 and actuate a latch lever 208 against the action of a spring 209 and release the right end (Fig. 8) of a clutch lever 210 mounted on a fixed pivot 211. Such right end of the lever 210 is urged upwardly by a spring 211' to bring a rack 212 into engagement with a pinion 213 on the clutch pin 42 to turn said pin against the action of a spring 214 and by means of the pins and slot connection 44 withdraw the pin 42 from the path of the arms 40 (Fig. 1), and thus break the clutch connection. The swinging of the latch lever 208 by means of the flexible connector 207 not only releases the right end of the lever 210 (Fig. 8) but through a link 215 rocks a lever 216 about the pivot 211 to swing the lever 210 to withdraw the rack 212 from the pinion 213 and permit the spring 214, (Fig. 2) to turn the pin 42 and by means of the pin-and-slot connection 44 restore it to a position to render the clutch effective.

It will be seen that the connection between the bell-crank 216 and the lever 210 is effected by a pin 217 projecting through a slot 218 in the bell crank and that the width of the slot 218 is such that the latch lever 208 is shifted to ineffective position before the bell crank 216 becomes effective to swing the lever 210 to withdraw the rack 212 from the pinion 213 and to permit a latch 219 to be swung by a spring 220 into engagement with the left end of lever 210 to prevent movement of the rack 212 into engagement with the pinion 213.

The machine may be stopped, when desired, by pressing rearwardly a handle 221 and a rod 222 (Fig. 1) against the resistance of a spring 223 attached at one end to a fixed bracket 224 through which the rod 222 passes and at the other end to a collar 225 on the rod 222, the normal position of the rod 222 being determined by the engagement of a collar 226 on the rod 222 with the fixed bracket 224. The rod 222 is supported near its rear end in a bracket 227 and is provided at its rear end with an enlarged end 228 to engage a lug 229 on the upright arm of a bellcrank 230 pivoted at 231 on the side wall of the switch box 189. At the end of the rearwardly extending arm of the bell crank 230 is a lug 232 positioned to actuate the core of a flexible connector 233 and thereby swing the latch 219 (Fig. 8), to ineffective position and permit the clutch lever 210 to be swung by the spring 211' to position the rack 212 in the path of the pinion 213.

Upon engagement of the pinion 213 with the rack 212, the pinion is turned to withdraw the clutch pin 42 to ineffective position and at the same time is moved to the left of the machine to actuate a plunger 234, (Fig. 2), against the action of a spring 235 and through the core of a flexible connector 236 rocks a bell crank 237 to engage the horizontal arm of the bell crank 200 to rock the upright arm thereof to the left (Fig. 8) and permit the lever 192 to be swung by a spring 238 in a counter-clockwise direction to disconnect the switch member 201 from the terminals 202 thereby throwing the motor out of action. It will be seen that the edge of the upright arm of the bell crank 200 is of arcuate form below the shoulder 205 to facilitate the operation of the lever 192.

Figure 6:
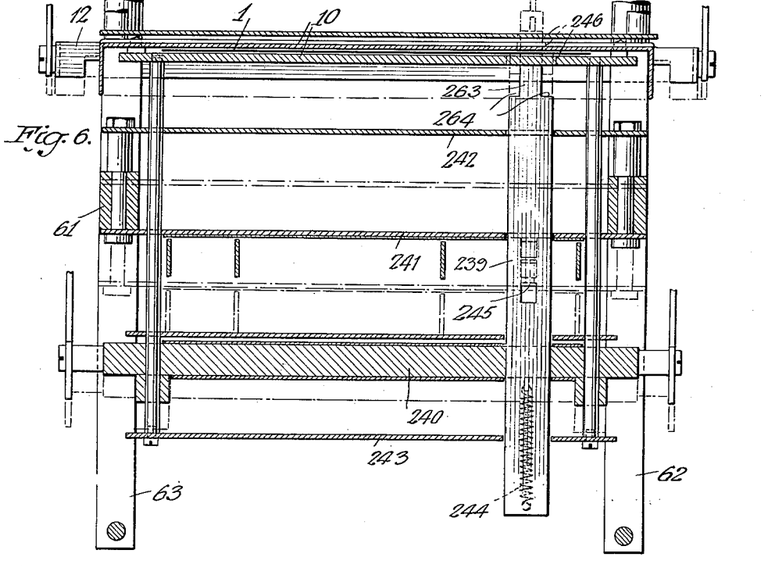
Fig. 6 is a fragmentary top view partly in section, showing the feeler associated with the pin box.

The stopping of the machine may be effected automatically due to the absence of a card at the analyzing position when the pin box is moved rearwardly. To this end provision is made of a slide 239, (Fig. 6), slidable in transverse members 240, 241, 242 and 243 of the pin box 113 and normally held by a spring 244 with a stop 245 against the front face of the members 241.

When during the analyzing movement of the pin box the slide 239 strikes a card 1, the slide will be stopped thereby and the spring 244 extended as required. When, however, there is no card in position the slide passes through openings 246 in the analyzing plates and rocks a lever 247, (Figs. 11 and 16), about a fixed pivot 248 and through a link 249 raises a link or interponent 250 to bring its rear end into alignment with a plunger 251 connected with the core of a flexible conductor 252, (Fig. 1), the other end of which overlies the rear end of the latch 219. At its other end the link 250, (Fig. 16), is pivoted to a lever 253 swingable about a fixed pivot 254 and normally held against a fixed stop 255 by means of a spring 256 attached at one end to a finger on the lever 253 and at the other end to a fixed part of the machine. Also mounted on the pivot 254 is a trip lever 257 provided with a lug 258 normally held in engagement with the rear edge of the lower arm of the lever 253 by means of a spring 259 attached at one end to a finger on the lever 257 and at the other end to the lever 253 at substantially the same point as the spring 256.

The lower end of the trip lever 257 is normally positioned in the path of a lug or pin 260 projecting laterally from an arm 261 mounted on the shaft 47 and at each revolution of the shaft both trip lever 257, (Fig. 16), and the lever 253 are rocked about the pivot 254 and the link or interponent 250 is moved rearwardly.

If there is an ordinary card in the analyzing position, the link 250 will be in its Fig. 1 position and the rearward movement of the link will be an idle one. If there is at the analyzing position a card with a notch 262 at its lower edge, the reduced forward end 263 of the slide 239 will pass through the notch 262, until the shoulders 264 rest against the card, and rock the lever 247 sufficiently to raise the rear end of the link 250 to a position to operate the core of a flexible connector 265 and thereby swing the latch 175 to ineffective position to modify the action of the tabulator printer as by causing two successive operations of the platen 19 during a single revolution of the cam shaft 100. If there is no card at the analyzing position, the slide 239 will move to its extreme rearward position and cause the rear end of the link 250 to be raised to a position to actuate the core of the flexible connector 252 to rock the latch 219 and thereby permit the spring 211' to swing the clutch lever 210 to effective position to disconnect the clutch and as hereinbefore described cause the motor to be thrown out of operation.

The sheet or web 18 is supplied from a roller 267 and extends therefrom over a guide 268, (Fig. 11), to the platen 19 and between the platen and feed rolls 269 to the front of the platen with which it is held in engagement by guiding means carried by pivoted arms 270 to permit movement thereof from the platen to facilitate manipulation of the web under certain conditions. From such guiding means the leading end of the web 19 is turned upwardly and rearwardly over the roller 267. For turning the platen 19 manually provision may be made of a member rotatably mounted adjacent the ratchet wheel 120 and comprising a finger wheel 271, (Fig. 1), and a pinion 272 meshing with the gear 119.

In practice, a pack of statistical cards with total cards inserted between predetermined groups of said statistical cards, is placed in the card magazine and the starting handle 184 is pressed rearwardly to start the machine in the manner hereinbefore described. As soon as a card is fed into the analyzing position the slide or feeler 239 is prevented from passing through the analyzing plates 10 and the machine will ordinarily operate continuously until the machine fails to present a card to be analyzed or until the stopping handle 221 is operated manually.

Each record card presented between the plates 10 is analyzed and the result of such analysis is transmitted by means such as well known flexible connectors having longitudinally movable cores to the tabulator printer 17 to not only run up suitable numbers in computing wheels therein but set type sectors 16 in accordance with such numbers and advance the platen 19 to cooperate with the types and by means of a ribbon not shown, print such numbers on a work sheet or web 18 on the platen. After each printing operation, the platen 19 will be turned by means actuated from the shaft 100 which also acts through suitable means to move the platen to and from the platen. It will be evident that for each revolution of the shaft 100 there is a definite cycle of operation.

Figure 7:
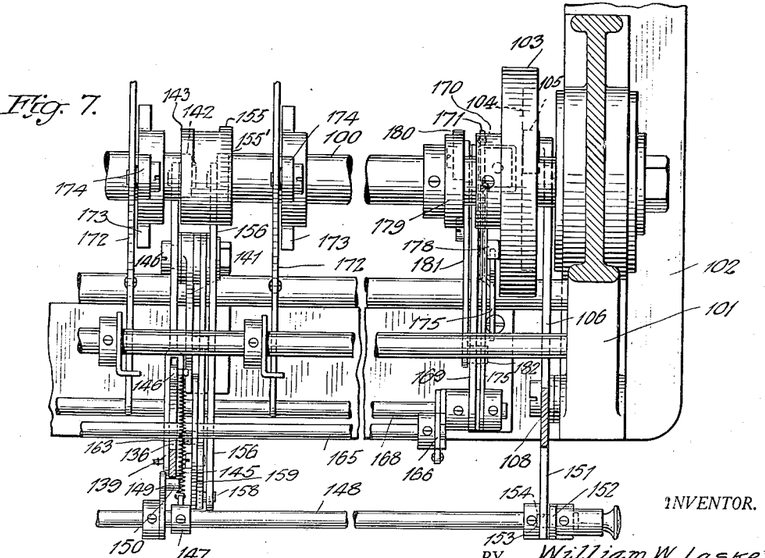
Fig. 7 is a detail view, looking from above, of part of the line spacing mechanism.

Ordinarily the platen 19 is actuated once for each rotation of the shaft 100 by means of a lever 139 and a link 137 but, upon presentation at the analyzing position of a total card having a notch 262, the feeler or slide 239 advances far enough to lift the link 250 into position to operate the core of the flexible connector 265 and shift the latch 175 to release the lever 171 to the action of spring 170, thus causing the rod 165 to be moved over the rear ends of levers 172 to be actuated thereby as indicated in Fig. 7. By such movement of the rod the lever 159 will be swung about its pivot 160 and the projection 158 moved into the horizontal branch of the slot 157 in the lever 156 also actuated once during each rotation of shaft 100 but later than lever 139. Such movement of projection 158 locks the lever 156 to the lever 161 and enables the latter through lugs 162 and 163 to operate the lever 139 and effect a second feeding movement of the platen during one rotation of a shaft 100 or a single cycle of operation. Upon further rotation of the shaft 100 the cam 179 will actuate the lever 181 and through the pin 182 restore the lever to a position to be engaged by latch 175, restoring the line feeding mechanism to single step operation. It should be understood that the swinging of the latch 175 to ineffective position may also be utilized to cause a total taking operation.

For the sake of simplicity many parts known in the prior art are not disclosed herein and in regard to such parts attention is called to said patent Number 1,438,924 and other patents relating to the same general class of machine.

While only a single form is shown in which this invention may be embodied, it is to be understood that the invention is not limited to any specific construction, but might be applied to various forms without departing from the spirit of the invention or the scope of the appended claims.

Variations may be resorted to within the scope of the invention, and portions of the improvements may be used without others.

Having thus described my invention, I claim:

1. In a card-controlled tabulating machine, computing mechanism and printing mechanism comprising types settable by said computing mechanism, and means for positioning a work sheet to cooperate with the types so set, including a link to effect line spacing, a lever to actuate said link, a cam to actuate said lever, a rotating shaft driving said cam, a second lever operable by said shaft, and means controlled by a suitably prepared card to render said second lever effective on the other lever to effect a second actuation of the first-mentioned lever during a single rotation of said shaft.

2. In a card-controlled tabulating machine, computing mechanism and printing mechanism comprising types settable by said computing mechanism and means for positioning a work sheet to cooperate with the types so set, including a link to effect line spacing, a lever to actuate said link, a cam to actuate said lever, a rotating shaft driving said cam, a second lever operable by said shaft, means controlled by a suitably prepared card to render said second lever effective on the other lever to effect a second actuation of the first-mentioned lever during a single rotation of said shaft, and means operable by said shaft to render ineffective such connection between the second lever and the first.

3. In a card-controlled tabulating machine, computing mechanism and printing mechanism comprising types settable by said computing mechanism and means for positioning a work sheet to cooperate with the types so set, including a link to effect line spacing, a lever to actuate said link, a cam to actuate said lever, a rotating shaft driving said cam, a second lever operable by said shaft, means controlled by a suitably prepared card to render said second lever effective on the other lever to effect a second actuation of the first-mentioned lever during a single rotation of said shaft, and means to control the effectiveness of the connection between said link and the first mentioned lever.

4. In a tabulator printer in which record cards are analyzed one by one, the data tabulated and the results printed on a work sheet, a platen around which the work sheet is fed step by step, and platen actuating means including a reciprocable link, a lever so connected with the link that by swinging the link the connector may be broken, a spring urging the link in a direction to break such connection, and manually controlled means to maintain such connection effective or to release said link and render said connection ineffective, a shaft constantly rotating during the operation of the machine, means on said shaft to actuate said lever once during each revolution of the shaft, and means rendered effective by a total card to cause an additional actuation of the lever during a revolution of the shaft.

5. In a tabulator printer in which record cards are analyzed one by one, the recorded data tabulated and the results of such operations printed in succession on a work sheet, a platen to support the work sheet and feed the same, and platen actuating means including a lever operating once for each actuation of the platen, a second lever on the same axis normally idle but provided with means for actuating the first lever, a bell crank pivoted on an extension of the second lever and having on its depending arm a laterally projecting member extending through a slot in the second lever concentric with the pivot of the bell-crank, a third lever on the same pivot actuable after the first lever, and having a slot with a horizontal branch parallel with the slot in the second lever and a branch extending downwardly from the outer end of the horizontal branch and normally containing the projecting member on the lower arm of the bell crank, and means thrown into action by a total card to move the lateral projection into the horizontal branch of the slot in the third lever to cause actuation thereby of the second lever and consequently the first lever.

6. In a card-controlled accounting machine, a platen, platen-actuating means acting once during each cycle of operation, a second actuating means normally disconnected from the platen-actuating means and operating once in each cycle but later than the first, and means controlled by a special card to render the second actuating means effective to cause a second actuation of the platen during a cycle of operation.

7. In a card-controlled accounting machine, a platen, platen-actuating means acting once during each cycle of operation, a second actuating means normally disconnected from the platen-actuating means and operating once in each cycle but later than the first, means controlled by a special card to render the second actuating means effective on the first to cause a second actuation of the platen during each cycle of operation, and comprising constantly actuated levers, a member spring-urged to a position over said levers, a latch normally holding said member out of the path of said members, and means rendered effective by a special card to shift said latch and permit said member to move over said levers for operation thereby and effect such second operation of the platen in a cycle thereof.

8. In a card-controlled accounting machine, a platen, actuating means therefor operable during each cycle of operation, a device normally operating idly once in each cycle, and means controlled by a total card to render said device effective on the platen-actuating means to cause a second actuation of the platen during a cycle of operation.

9. In a card-controlled accounting machine, a platen, means for operating the same once during each cycle of operation, a plurality of levers actuable once during each of such cycles, a member extending transversely of said levers, extensible swingable arms on which said member is mounted, means normally urging said member to a position to be actuated by said levers, a latch to maintain said member in ineffective position, total-card-controlled means to release said latch, and means actuable by said levers through said members to cause a second actuation of the platen during a single cycle of operation.

10. In a card-controlled accounting machine, a platen, platen operating means, a member through which said platen operating means is actuated, a device actuated once during each cycle of operation to actuate said member, a second device actuated once during each cycle of operation and later than the first device, and means controlled by a total card to render the second device effective to actuate said member to effect a second operation of the platen during a single cycle of operation.

11. In a card-controlled accounting machine, a platen, platen operating means, a member through which said platen operating means is actuated, a device actuated once during each cycle of operation to actuate said member, a second device actuated once during each cycle of operation and later than the first device, means controlled by a total card to render the second device effective to actuate said member to effect a second operation of the platen during a single cycle of operation, and means acting at the end of such cycle to render the second device ineffective to actuate said member.

12. In a card-controlled accounting machine, a platen, platen operating means, a member through which said platen operating means is actuated, a device actuated once during each cycle of operation to actuate said member, a second device actuated once during each cycle of operation and later than the first device, means controlled by a total card to render the second device effective to actuate said member to effect a second operation of the platen during a single cycle of operation, and manually operable means to destroy the operative relation between said member and the first device to prevent operation of the platen.

13. The combination with paper feeding devices and an operating mechanism having a cycle of operation, of two devices actuated by said operating mechanism at different times in the course of each cycle and both capable of actuating the paper feed mechanism, and card controlled means for controlling the effectiveness of one of said devices to feed the paper.

14. The combination with paper feeding devices and an operating mechanism having a cycle of operation, of a device actuated by said operating mechanism at each cycle of operation and normally ineffective to actuate the paper feed devices, mechanism including a spring actuated part for rendering said devices effective, a latch 175 normally holding said spring actuated devices in ineffective position, card controlled means for tripping said latch and means for restoring said spring actuated devices to ineffective position after a single operation of said devices.

In witness whereof I affix my signature.

WILLIAM W. LASKER.